(12) United States Patent
Bartley et al.

(10) Patent No.: US 8,639,879 B2
(45) Date of Patent: Jan. 28, 2014

(54) SORTING MOVABLE MEMORY HIERARCHIES IN A COMPUTER SYSTEM

(75) Inventors: Gerald K. Bartley, Rochester, MN (US); John M. Borkenhagen, Rochester, MN (US); Philip R. Germann, Oronoco, MN (US); William P. Hovis, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 399 days.

(21) Appl. No.: 12/731,320

(22) Filed: Mar. 25, 2010

(65) Prior Publication Data

US 2011/0238879 A1      Sep. 29, 2011

(51) Int. Cl.
*G06F 13/00* (2006.01)

(52) U.S. Cl.
USPC ............... 711/115; 711/170; 710/8; 710/104; 713/100

(58) Field of Classification Search
USPC ................ 711/115, 170; 710/8, 104; 713/100
See application file for complete search history.

(56) References Cited

U.S. PATENT DOCUMENTS

| | | | | |
|---|---|---|---|---|
| 6,381,685 B2* | 4/2002 | Dell et al. | | 711/170 |
| 6,766,469 B2* | 7/2004 | Larson et al. | | 714/5.1 |
| 7,069,523 B2* | 6/2006 | Nation et al. | | 716/104 |
| 7,222,224 B2* | 5/2007 | Woo et al. | | 711/167 |
| 7,681,023 B2* | 3/2010 | Volentine et al. | | 713/1 |
| 7,717,350 B2* | 5/2010 | Ober et al. | | 235/492 |
| 7,730,338 B2* | 6/2010 | Rajan et al. | | 713/320 |
| 7,818,489 B2* | 10/2010 | Karamcheti et al. | | 711/101 |
| 2006/0143400 A1* | 6/2006 | Steely | | 711/136 |
| 2007/0086232 A1* | 4/2007 | Joshi et al. | | 365/154 |
| 2007/0220228 A1* | 9/2007 | Huang | | 711/170 |

OTHER PUBLICATIONS

Panda, Preeti Ranjan, et al. "Data and memory optimization techniques for embedded systems." ACM Transactions on Design Automation of Electronic Systems (TODAES) 6.2 (2001): 149-206.*
J. Wolf. 1989. The placement optimization program: a practical solution to the disk file assignment problem. In Proceedings of the 1989 ACM SIGMETRICS international conference on Measurement and modeling of computer systems (SIGMETRICS '89). ACM, New York, NY, USA, 1-10.*

* cited by examiner

*Primary Examiner* — Sanjiv Shah
*Assistant Examiner* — Samuel Dillon
(74) *Attorney, Agent, or Firm* — Patterson & Sheridan LLP (57) ABSTRACT

Method and apparatus for optimally placing memory devices within a computer system. A memory controller may include circuitry configured to retrieve or one or more performance metrics a plurality of memory devices connected thereto. Based on the performance metrics and one or more predefined rules for placing memory devices, the circuitry may determine an optimal placement of the memory devices in the system.

18 Claims, 7 Drawing Sheets

SORTING MOVABLE MEMORY HIERARCHIES IN A COMPUTER SYSTEM

BACKGROUND

1. Field

The present invention relates to computer systems, and more specifically to the placement of memory devices within the computer systems.

2. Description of the Related Art

A computer system may generally include a processor and a plurality of memory devices for storing data and applications necessary for operating the system. The processor may access the plurality of memory devices to retrieve instructions of an application and execute the instructions to perform one or more functions associated with the application. Executing the instructions may involve accessing the memory devices to retrieve data, modifying the data, and/or storing modified data back into the memory devices.

SUMMARY

The present invention relates to computer systems, and more specifically to the placement of memory devices within the computer systems.

One embodiment of the invention provides a method for optimally placing a plurality of memory devices in a plurality of memory slots of a system. The method generally comprises determining a slot of the plurality of slots in which the memory device is placed for each memory device in the system, and determining a predefined rule for placing memory devices in the plurality of memory slots. The method further comprises accessing the plurality of memory devices to determine one or more performance metrics of the memory devices, and determining an optimal placement of the plurality of memory devices in the plurality of memory slots based on the predefined rule and the determined performance metrics of the plurality of memory devices.

Another embodiment of the invention provides a logic circuit configured to determine optimal placement of a plurality of memory devices in a plurality of memory slots of a system. The logic circuit is generally configured to determine a slot of the plurality of slots in which the memory device is placed for each memory device in the system, and determine a predefined rule for placing memory devices in the plurality of memory slots. The logic circuit is further configured to access the plurality of memory devices to determine one or more performance metrics of the memory devices, and determine an optimal placement of the plurality of memory devices in the plurality of memory slots based on the predefined rule and the determined performance metrics of the plurality of memory devices.

Yet another embodiment of the invention provides a system, generally comprising a controller and a plurality of memory devices placed in a plurality of memory slots. The controller is generally configured to determine a slot of the plurality of slots in which the memory device is placed for each memory device in the system, and determine a predefined rule for placing memory devices in the plurality of memory slots. The controller is also configured to access the plurality of memory devices to determine one or more performance metrics of the memory devices, and determine an optimal placement of the plurality of memory devices in the plurality of memory slots based on the predefined rule and the determined performance metrics of the plurality of memory devices.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the invention generally relate to computer systems, and more specifically to the placement of memory devices within the computer systems. A memory controller may include circuitry configured to retrieve one or more performance metrics from a plurality of memory devices connected thereto. Based on the performance metrics and one or more predefined rules for placing memory devices, the circuitry may determine an optimal placement of the memory devices in the system.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Virtually all computer circuits employ some sort of digital memory to store data. Such memory can include a combination of different types of memory devices, including one or more of the following: on-chip memory (such as array of registers), on board memory (such as cache memory), main memory (such as DRAM memory chips on a different circuit board from a processor), flash memory (such as memory device that can be plugged into a special reader or a USB port), and disk memory (such as a hard drive).

Some data units (which can include any method of grouping data) residing in a memory space are less-used than other data units stored on the same memory space. However, different parts of a computer's memory space exhibit different memory latencies (the amount of time it takes for data to be transferred from a memory location to the entity that requested it). For example, memory chips closest to a memory buffer are likely to have a lower latency than memory chips farther away from the memory buffer.

Most memory devices can be classified in terms of relative speed. For example, on-chip memory is usually faster that on-board memory, and both are usually much faster than disk memory. However, sometimes certain portions of a relatively slower memory device may actually have a lower latency than portions of a relatively faster memory device. Therefore, placing frequently used data units in a slower portion of the faster memory device instead of the faster portion of the slower memory device may result in an inefficient usage of memory space.

In many memory applications, dynamic random access memory (DRAM) chips are placed at similar rank positions in an array, thereby creating a flat memory structure in which all of the memory is accessible for data writes and reads equally from the memory controller. However, in current industry-standard schemes, such as fully buffered dual in-line memory module (FBDIMM), there is a non-uniform access time to each layer of memory through buffers on the memory chips. Memory controllers supporting the current FBDIMM standard can therefore take advantage of lower latencies for closer DIMM chips.

The latency of physical memory locations can change over time. This can be due to various factors. For example, environmental conditions can cause changes in memory latency. Also, usage patterns can change memory latency. For example, when several contiguous memory locations are used computationally in a tight loop, other nearby memory locations might experience an increase in latency due to local traffic on the memory bus servicing the memory locations.

Figure 1:
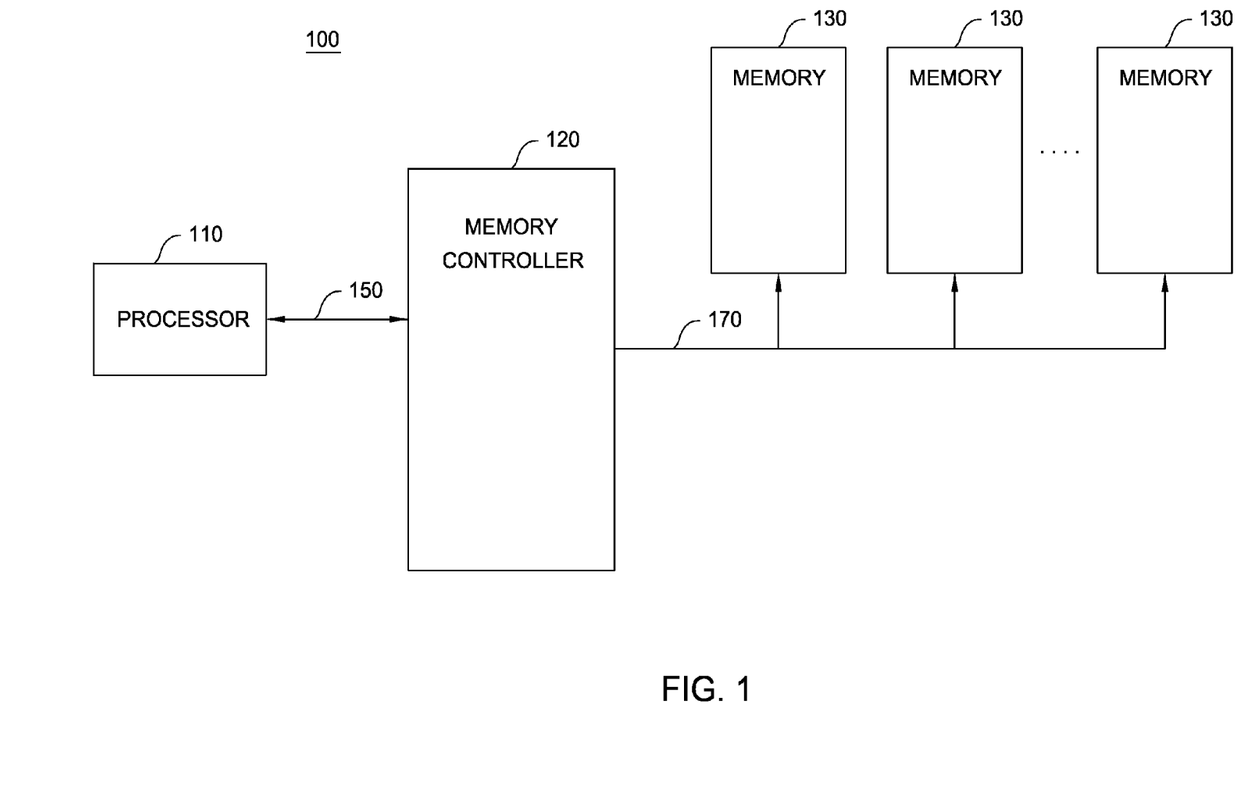
FIG. 1 illustrates an exemplary system according to an embodiment of the invention.

FIG. 1 illustrates an exemplary system 100, according to an embodiment of the invention. As illustrated in FIG. 1, the system 100 may include a processor 110, a memory controller 120, and a plurality of memory devices 130. The processor 110 may be configured to access the memory devices 130 via the memory controller 120. In one embodiment, the processor 110 may be configured to issue memory access commands to the memory controller 120 via a system bus 150. The memory access commands may include, for example, read commands and write commands. The memory access commands may include an address specifying a memory location within a memory device 130 that is to be accessed.

The memory controller 120 may be configured to receive the memory access commands from the processor 110 and initiate an access to a memory 130. As illustrated in FIG. 1, the memories 130 may be coupled to the memory controller 120 via a memory bus 170. The memory bus 170 may include a plurality of conductive lines. In one embodiment of the invention, the plurality of conductive lines may include a plurality of address lines, a plurality of data lines, and/or a plurality of command lines.

The address lines may be configured to transfer a plurality of address bits specifying a location within a respective memory 130 that is to be accessed. The command lines may be configured to transfer control signals such as, for example, chip select, data available, read enable, write enable, row address strobe (RAS), column address strobe (CAS), and the like. The data lines may be used to exchange data between the memory controller 120 and a respective memory device 130. In one embodiment of the invention the memory bus 170 may include one or more conductive lines configured to transfer and combination of address, data, and command signals.

The memory devices 130 illustrated in FIG. 1 may include any combination of different types of memory devices including, for example, random access memories (RAMs), read only memories (ROMs), flash memories, magnetic disks, and the like. In a particular embodiment of the invention, each memory device 130 may represent a dual inline memory module (DIMM), each comprising a plurality of dynamic random access memory (DRAM) chips. In alternative embodiments, each memory device 130 may be a single inline memory module (SIMM) including a plurality of DRAM chips. In yet another embodiment, each memory device 130 may be a single DRAM chip.

In one embodiment of the invention, each of the memory devices 130 may be similar type devices arranged in an array. For example, each of the memory devices 130 may represent DIMMs comprising DRAM chips that are arranged next to one another to form an array of DRAM chips. While the memory devices 130 may be of the same type, the data transfer latency for each memory device 130 may be different. The data transfer latency may represent, for example, a time necessary for transferring data between a memory device 130 and the memory controller 120.

In one embodiment of the invention, the data transfer latency for a particular memory device 130 may depend on a distance between the memory device 130 and the memory controller 120. For example, referring to FIG. 1, each memory device 130 is shown as being a different distance from the memory controller 120. The greater the distance between a memory device 130 and the memory controller 120, the greater the length of the memory bus 170 coupling the memory device 130 to the memory controller 120. Accordingly, data transferred between the memory controller 120 and the memory device 130 may have to travel a greater distance on the memory bus 170, thereby increasing the data transfer latency of the memory device in comparison to other memory devices 130 that are closer to the memory controller 120.

Figure 2:
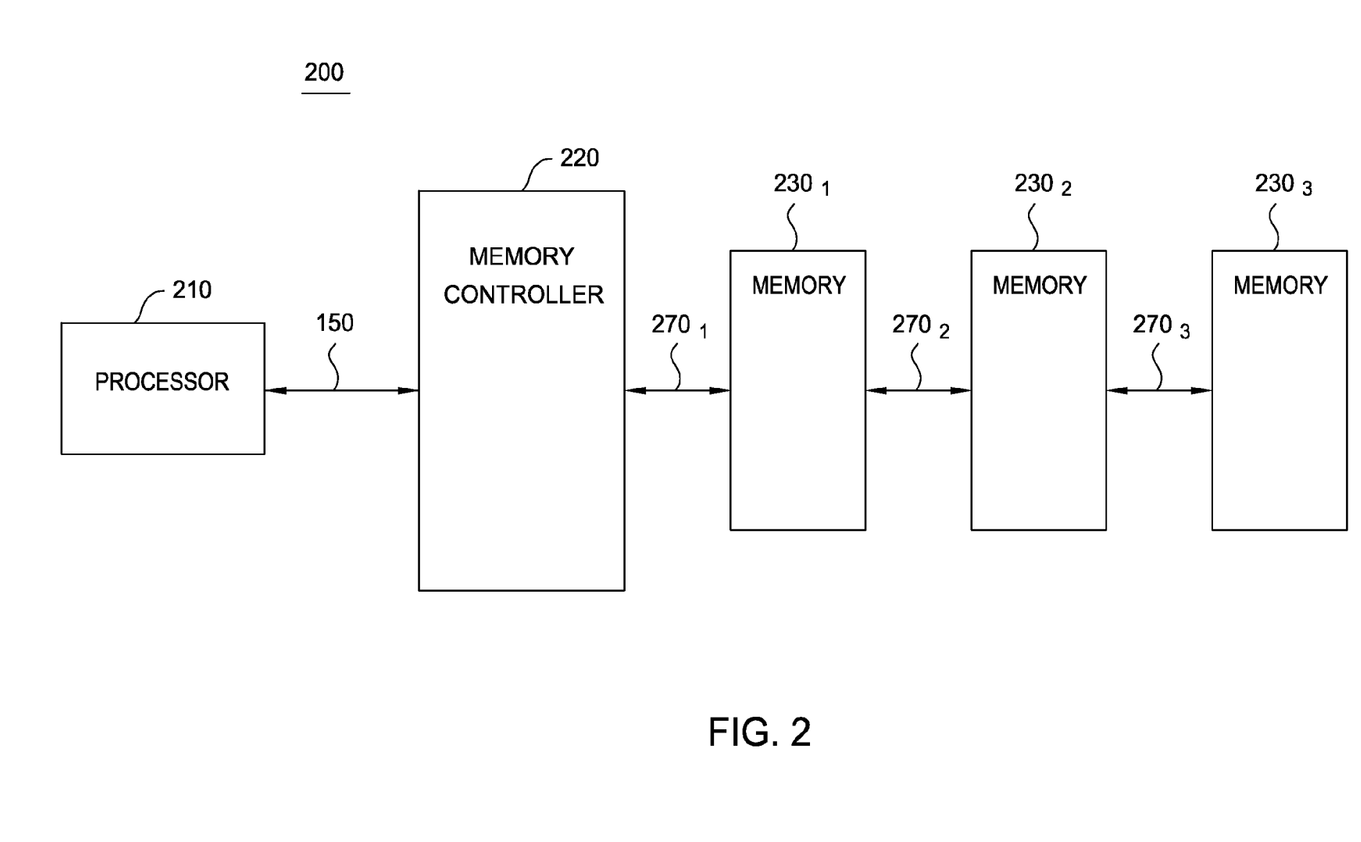
FIG. 2 illustrates another exemplary system according to an embodiment of the invention.

FIG. 2 illustrates an exemplary system 200 according to another embodiment of the invention. Like system 100 of FIG. 1, the system 200 may also include a processor 210, a memory controller 220, and a plurality of memory devices 230. The processor 110 may be coupled with the memory controller via a system bus 250. Further, as illustrated in FIG. 2, the memory devices 230 may be coupled with the memory controller 220 in a daisy chained manner. For example, the memory controller 220 is shown coupled with a first memory device $230_1$ via a first bus $270_1$, the memory device $230_2$ is coupled with the memory device $230_1$ via a second bus $270_2$, the memory device $230_3$ is coupled with the memory device $230_2$ via a third bus $270_3$, and so on.

Accessing data in the memory devices $230_1$-$230_3$ in FIG. 2 may involve transferring address, data, and command signals from one memory device 230 to another until the signals are transferred to a desired device. For example, to retrieve data from the memory device $230_3$, the memory controller 220 may transfer command and address signals to the memory device $230_1$ via the bus $270_1$. The memory device $230_1$ may determine based on, for example, the received address and/or command signals, whether a memory location within the memory device $230_1$ is to be accessed. If a memory location local to the memory device $230_1$ is not to be accessed, the memory device $230_1$ may transfer the command and address signals to the memory device $230_2$ via the second bus $270_2$. The memory device $230_2$ may also similarly determine whether a local memory location therein is to be accessed, and if not, transfer the command and address signals to the memory device $230_3$ via the bus $270_3$.

Upon receiving command and address signals for accessing a memory location therein, the memory device $230_3$ may transfer data associated with the received address to the memory device $230_2$. The memory device $130_2$ may transfer the data received from the memory device $230_3$ to the memory device $130_1$, which may, in turn, transfer the received data to the memory controller 120. In this manner, the memory access to the memory device $230_3$ may be completed.

In one embodiment of the invention, each of the memory devices $230_1$-$230_3$ may be of a similar type. For example, in one embodiment, the memory devices $230_1$-$230_3$ may have the same or similar memory specifications. In a particular embodiment, the memory devices $230_1$-$230_3$ may be DIMMs comprising similar type DRAM chips. In an alternative embodiment, the memory devices $230_1$-$230_3$ may be the DRAM chips themselves. While each of the memory devices $230_1$-$230_3$ may be of the similar type, in some embodiments, the time for accessing a memory location within each of the memory devices $230_1$-$230_3$ may be different. For example, each memory device 230 may include components such as logic circuitry, decoders, buffers and the like which facilitate accessing a memory array or bank within the memory device 230. The components of the memory device 230 may access the memory array based on the received command and address signals.

However, due to a wide variety of factors affecting the fabrication of the memory devices 230, the components of each memory device 230 may be differently formed, which may affect the time taken by the components to access a memory location within the memory device 230. For example, process variations during fabrication may cause even memory devices 230 with a same design to be formed with slight physical differences which may affect the time necessary to retrieve data from the memory device. In some embodiments, the time for accessing a memory location within a memory device may depend on one or more external factors such as, for example, a temperature at the location of the memory device, the value of the voltage provided to the memory device, and the like.

In one embodiment of the invention, the total latency for accessing a memory device by the memory controller (also referred to hereinafter as the total memory access latency) may be a function of the time for accessing a memory location within the memory device 230 and the data transfer latency for transferring data from the memory device 230 to the memory controller 220 via a bus. For example, in system 100 illustrated in FIG. 1, the total memory access latency for each of the memory devices may be determined based on a sum of the time for accessing a memory location within the memory device and the time for transferring signals between the memory device 130 and the memory controller 120 via the memory bus 170. In system 200 illustrated in FIG. 2, the total memory access latency for each of the memory devices 230 may include a time for accessing a memory location within the memory device 230 and a time for transferring signals via one or more of the busses $270_1$-$270_3$. The total memory access latency in system 200 may also include time taken by one or more of the memory devices 230 to analyze received address, command, and/or data signals to determine whether the signals are associated with a local memory access.

In some systems, it has been found that a large majority (for example greater than 95%) of the memory accesses take place within around 25% of the available memory addresses. In other words, only 25% of the total memory addresses available in the plurality of memory devices 130 in each of systems 100 and 200 may be used in over 95% of the memory accesses. Therefore, in one embodiment of the invention, data that is used frequently may be stored in memory devices that are closest to the memory controller. By storing frequently used data in memory devices closest to the memory controller, the data transfer latency for retrieving the data may be greatly reduced, thereby improving performance of the system. For example, referring to FIG. 2, the most frequently used data may be stored in the memory device $230_1$, which is closest to the memory controller 220, because the data transfer latency for retrieving the data from the memory device $230_1$ may be smaller than the data transfer latency for retrieving the data from the memory devices $230_2$ and $230_3$.

However, as described above, the total memory access latency may depend on both, the data transfer latency on a bus as well as the time to access a memory location within the memory device. Because the time to access a memory location may be different in each device, it may be desirable to place the memory devices with the smallest memory access times at the locations that are closest to the memory controller to achieve the smallest total memory access latency possible.

Embodiments of the invention provide methods systems and articles of manufacture for measuring the memory access times of each memory device of the system and providing a recommendation for physical placement of the memory devices within the system to achieve a maximum efficiency in accessing data stored therein.

Figure 3:
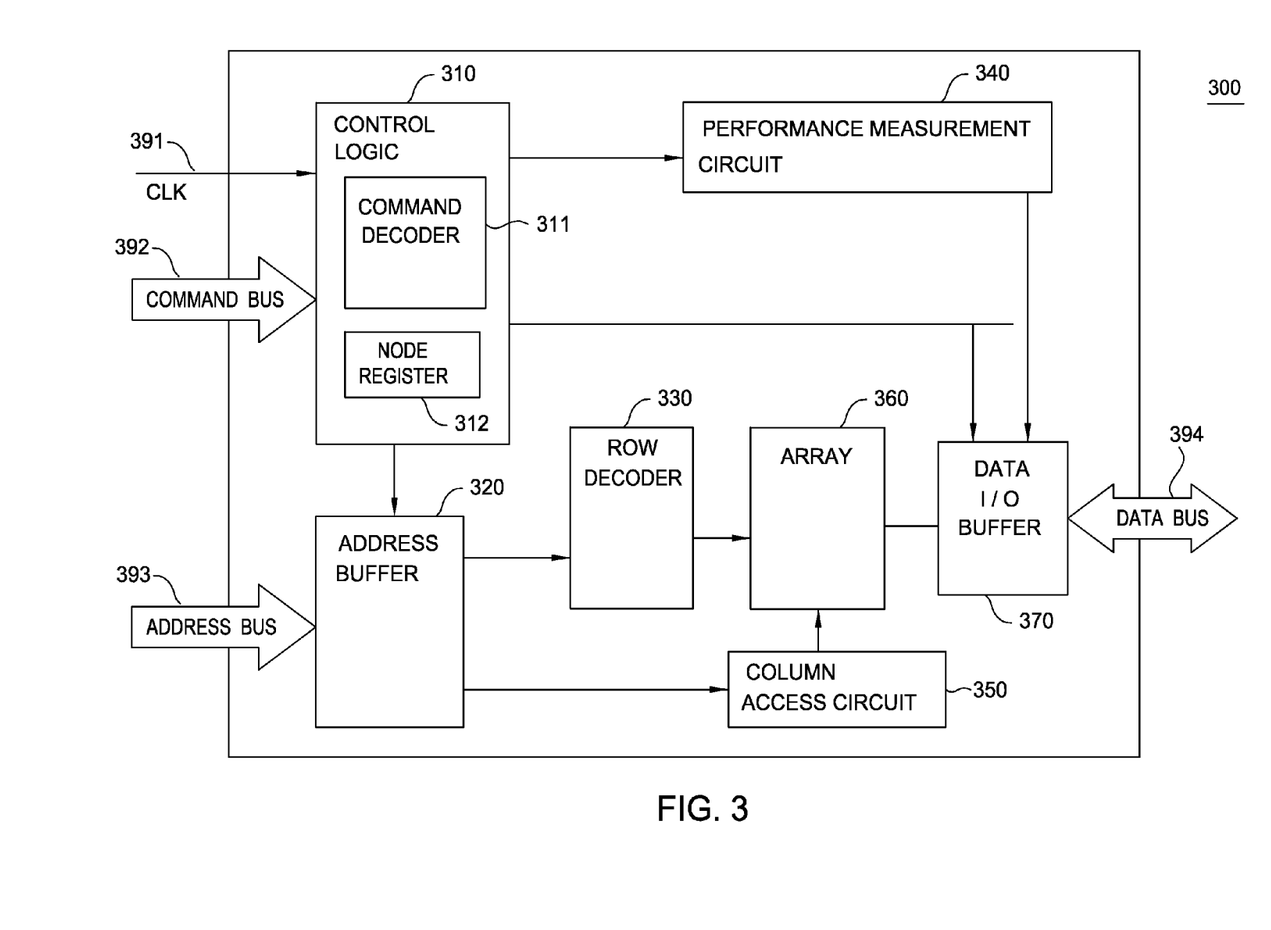
FIG. 3 illustrates a memory device according to an embodiment of the invention.

FIG. 3 illustrates an exemplary memory device 300 according to an embodiment of the invention. For illustrative purposes, the memory device 300 is shown as a DRAM memory chip. In one embodiment of the invention, the memory device 300 may correspond to any one of the memory devices 130 and 230 illustrated in FIGS. 1 and 2 respectively. As illustrated in FIG. 3, the memory device 300 may include control logic circuitry 310, an address buffer 320, a row decoder 330, a performance measurement circuit 340, a column access circuit 350, at least one memory array or bank 360, and a data IO buffer 370.

In one embodiment of the invention, the memory device 300 may be coupled with a plurality of external signal lines. The external signal lines may correspond to the busses 170 and 270 illustrated in FIGS. 1 and 2 respectively. For example, as illustrated in FIG. 3, the memory device may be coupled with a clock signal line 391, a command bus 392, an address bus 393, and a data bus 394. While distinct command, address, and data busses are shown in FIG. 1, in alternative embodiments, one or more external signal lines may be configured to transfer any combination of address, command, and data signals.

The control logic 310 may be configured to receive a clock signal via the clock signal line 391 and command signals via the command bus 392. The command signals may include, for example, chip select, write enable, column address strobe (CAS), row address strobe (RAS), and the like. In response to receiving the command signals, the control logic 310 may generate control signals for accessing the memory banks 360 of the memory device, as is describe below.

As illustrated in FIG. 3, the control logic 310 may include a command decoder 311 and mode registers 312. The command decoder 311 may be configured to receive and interpret the command signals received from the command bus 392. For example, the command decoder may determine which one of a read operation, write operation, memory refresh operation, or the like is to be performed based on the command signals received from the command bus 392. The mode registers 312 may store parameters that control operation of the memory device 300. Exemplary parameters that may be stored in the mode registers include an operating mode of the memory device (e.g. low power mode, normal mode, etc.), CAS latency, burst length, and the like.

The address buffer 320 may be configured to capture address signals from the address bus 393. The control logic 310 may govern the capturing of address signals by the address buffer 320. In other words, the control logic 310 may generate control signals that cause the address buffer 320 to latch address signals on the address bus 393. Accordingly, the address buffer 320 is coupled with the control logic 310, as shown in FIG. 3. In one embodiment, the address signals received by the address buffer 320 may include row addresses and column addresses. The row address and column address may identify a particular row and column of the bank where data is to be accessed. The column access circuit 350 may receive column addresses from the address buffer 320 and select a particular column in a bank 360.

The memory bank 360 may include a plurality of memory cells arranged in a plurality of rows and columns. Each memory cell may include a capacitor for storing charge and an access transistor that facilitates altering or sensing the charge stored in the capacitor. The charge stored in the capacitor may correspond to a logical bit, for example, a logical 1 bit or a logical 0 bit.

The data IO buffer may be a storage element such as, for example, a register configured to temporarily store data that is transferred via the data bus 394. For example, the data buffer 370 may temporarily store data that is retrieved from the memory banks 360. Thereafter, upon receiving a control signal from the control logic 310, the data from the data buffer 370 may be transferred to an external device such as, for example, a memory controller via the memory bus 394. The data buffer 370 may also be configured to latch data received with the data bus 394 and temporarily hold the data until the data is written to a memory bank 360.

The performance measurement circuit 340 may be configured to measure one or more performance metrics of the memory device 130. For example, in one embodiment, the performance measurement circuit 340 may be configured to determine the time required to access the memory array 360. In one embodiment of the invention, the performance measurement circuit 340 may include circuit elements that simulate the timing of one or more components of the memory device 300, for example, the control logic 310, address buffer 320, row decoder 330, column decoder 350, memory array 360, data IO buffer 370, and the like, thereby allowing the performance measurement circuit 340 to indicate the time required to access the memory array 360.

While a performance measurement circuit configured to determine memory access latency is described hereinabove, in alternative embodiments, the performance measurement circuit 340 may be configured to measure any other memory parameters including power consumption, and the like.

As illustrated in FIG. 3, the performance measurement circuit 340 may be coupled with the control logic 310. In one embodiment of the invention, the control logic 310 may be configured to receive a command requesting a performance parameter of the memory device 300. In response to receiving such a command, the control logic 310 may signal the performance measurement circuit 340 to measure a performance parameter such as, for example, the time required to access the memory array 360. In one embodiment, the performance measurement circuit 340 may be configured to output measured parameters to a requesting device via the data 10 buffer 370 and the data bus 394, as illustrated in FIG. 3.

Figure 4:
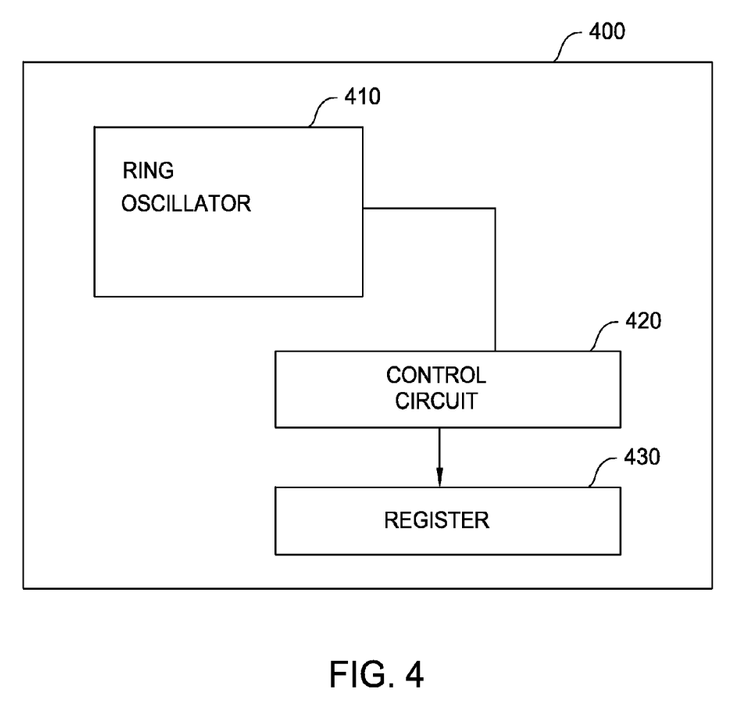
FIG. 4 illustrates a performance measuring circuit according to an embodiment of the invention.

FIG. 4 illustrates a more detailed view of an exemplary performance measurement circuit 400 according to an embodiment of the invention. The performance measurement circuit 400 may correspond to the performance measurement circuit 340 illustrated in FIG. 3. As shown in FIG. 4, the performance measurement circuit 400 may include a ring oscillator 410, a control circuit 420, and a register 430. The oscillator circuit 410 may be configured to generate an output signal which may oscillate at a frequency that indicates a time for accessing a memory array of the memory device.

The control circuit 420 may be configured to receive the output signal from the ring oscillator 410 and compute one or more performance parameters. For example, in one embodiment, the control circuit 420 may analyze the frequency of the output signal received from the ring oscillator and compute the time for accessing a memory array of the memory device based on the frequency of the output signal. In one embodiment of the invention, the performance parameters determined by the control circuit may be stored in the register 430. The performance parameters may be retrieved from the register, for example, by issuing a command to the memory device.

In one embodiment of the invention, the memory controller may be configured to retrieve performance parameters from a plurality of memory devices connected thereto, and suggest an optimal placement of the memory devices based on one or more predefined rules. The predefined rules may include for example, placing memory devices with lowest latencies closest to the memory controller, placing devices with lowest power consumption closest to the memory controller, or the like.

Figure 5:
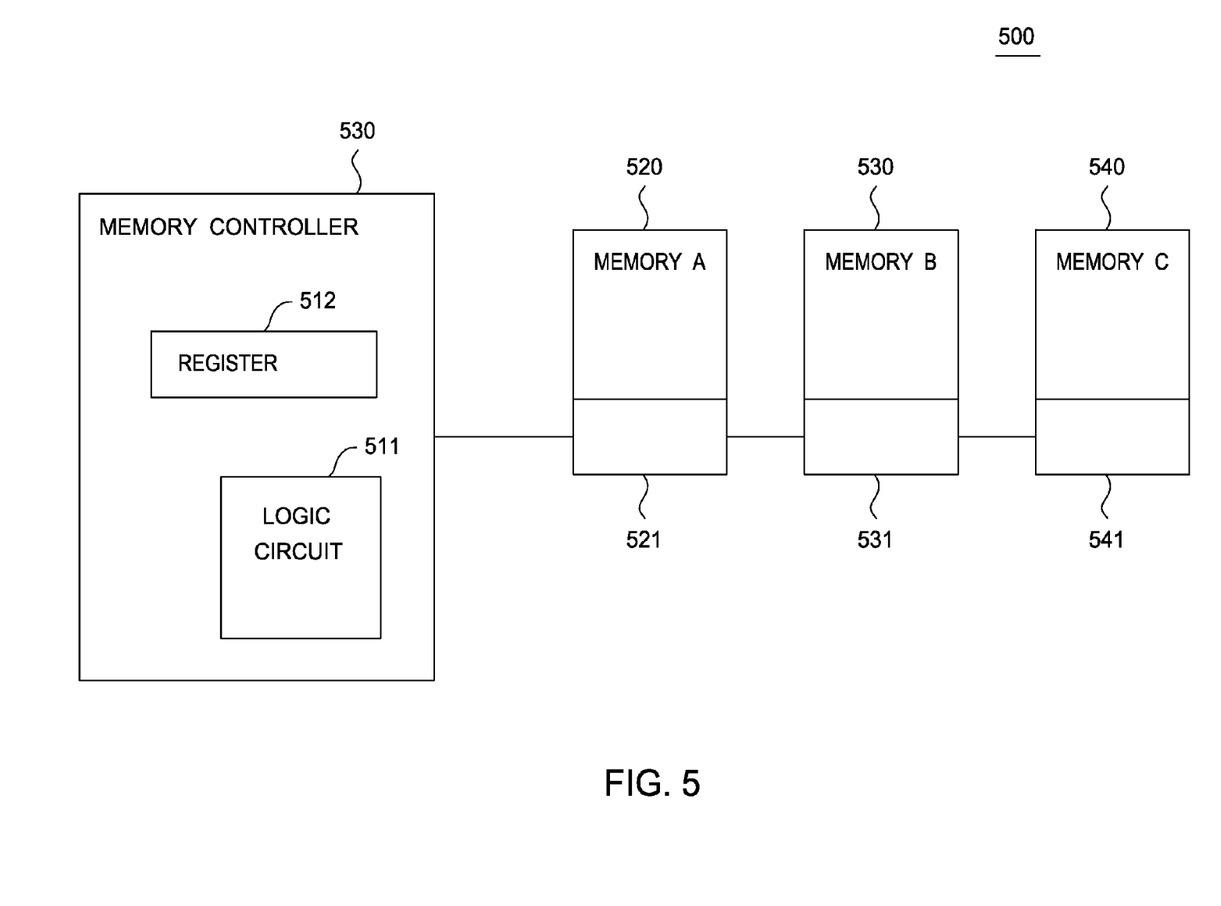
FIG. 5 illustrates placement of memory devices in a plurality of memory slots, according to an embodiment of the invention.

FIG. 5 illustrates exemplary placement of memory devices, according to an embodiment of the invention. As illustrated in FIG. 5, a memory controller 510 may be configured to access memory devices 520-540 which may be placed in each of a plurality of memory slots 521-541. The memory devices 520-540 may be the same type of memory devices, e.g., DRAMs, or different types of memory devices, e.g., Flash memory and DRAM. In some embodiments, each memory device may be a single device such as a single DIMM. However, in alternative embodiments, each memory device may represent a group of memory devices, e.g., a memory drawer. Each of the memory devices 520-540 may have a unique identifier. For example, in FIG. 5, the memory devices 520-540 are identified as memories A-C.

In one embodiment of the invention, the memory controller 510 may include a logic circuit 511 configured to determine optimal placement of the memory devices in the slots 521-541 based on one or more predefined placement rules. Exemplary placement rules may include, for example, placing memory devices with the lowest latency closest to the memory controller, placing memory devices with the lowest power consumption closest to the memory controller, and the like. In alternative embodiments, any other placement rule based on one or more parameters of the memory devices may be used. In one embodiment, the predefined rules may be programmed into one or more registers 512 of the memory controller. For example, a processor, e.g., processors 110 in FIGS. 1 and 2 may program the predefined rules by setting one or more bits in the register 512.

Alternatively, in some embodiments, the predefined rules may be communicated to the memory controller 510 from a processor. For example, in one embodiment, the memory controller 510 may be configured to receive commands from a processor directing the memory controller to determine an optimal placement of memory devices based on a predefined rule sent with the commands. In response to receiving the commands, the logic circuitry 511 may be configured to perform one or more operations to determine one or more performance parameters of the memory devices 520-540.

In one embodiment, the operations may include accessing performance metrics that may be stored in the performance measurement circuit 340 (see FIG. 3). For example, the logic circuit 511 may cause the memory controller 510 to issue a command to read a register, e.g., register 430, within the performance measurement circuitry.

In some embodiments, the logic circuit 511 may cause the memory controller 510 to issue one or more access commands to the memory devices 520-540. Exemplary access commands may include read commands, write commands, and the like. The logic circuit 511 may be configured to calculate one or more performance parameters such as latency based on the response received from the memory devices 520-540 during execution of the commands. Furthermore, execution of the commands may cause a register, e.g., register 430, of a performance measurement circuits within each of the memory devices 520-540 to be updated. One or more performance metrics may therefore be retrieved by the memory controller 510 after the memory devices 520-540 execute the commands.

In one embodiment, the logic circuit 511 may be configured to determine optimal placement of the memory devices 520-540 in the memory slots 521-541 based on the retrieved or computed performance metrics. For example, in one embodiment, the logic circuit 511 may determine that memory 520 has the lowest memory latency and that memory 540 has the highest memory latency. Based on a predefined rule requiring lowest memory latency devices to be placed closest to the memory controller, the logic circuit 511 may determine that the memory device 540 should be placed in memory slot 521, memory device 530 should be placed in memory slot 531, and that memory device 520 should be placed in memory slot 541.

The logic circuit 511 may be configured to report the optimal placement of the memory devices to a processor, e.g., processor 110 in FIGS. 1 and 2. The optimal placement of the memory devices reported may include an identification of each memory device, e.g., by the unique memory ID, and a suggested memory slot for the memory device. The processor may be configured to display the optimal placement of the memory devices to a user via, e.g., a display screen. The user may then decide to reorder the memory devices in the memory slots based on the suggested optimal placement.

In one embodiment of the invention, the above referenced operations of the memory controller may be performed during system initialization, e.g., during power on self test (POST) or other initial program load (IPL) operations. In another embodiment, the operations performed by the memory controller may be controlled by a low level application program which may be executed by a processor. The low level application may be executed at the direction of, for example, an assembler of a system including the memory controller and memory devices in a system.

Figure 6:
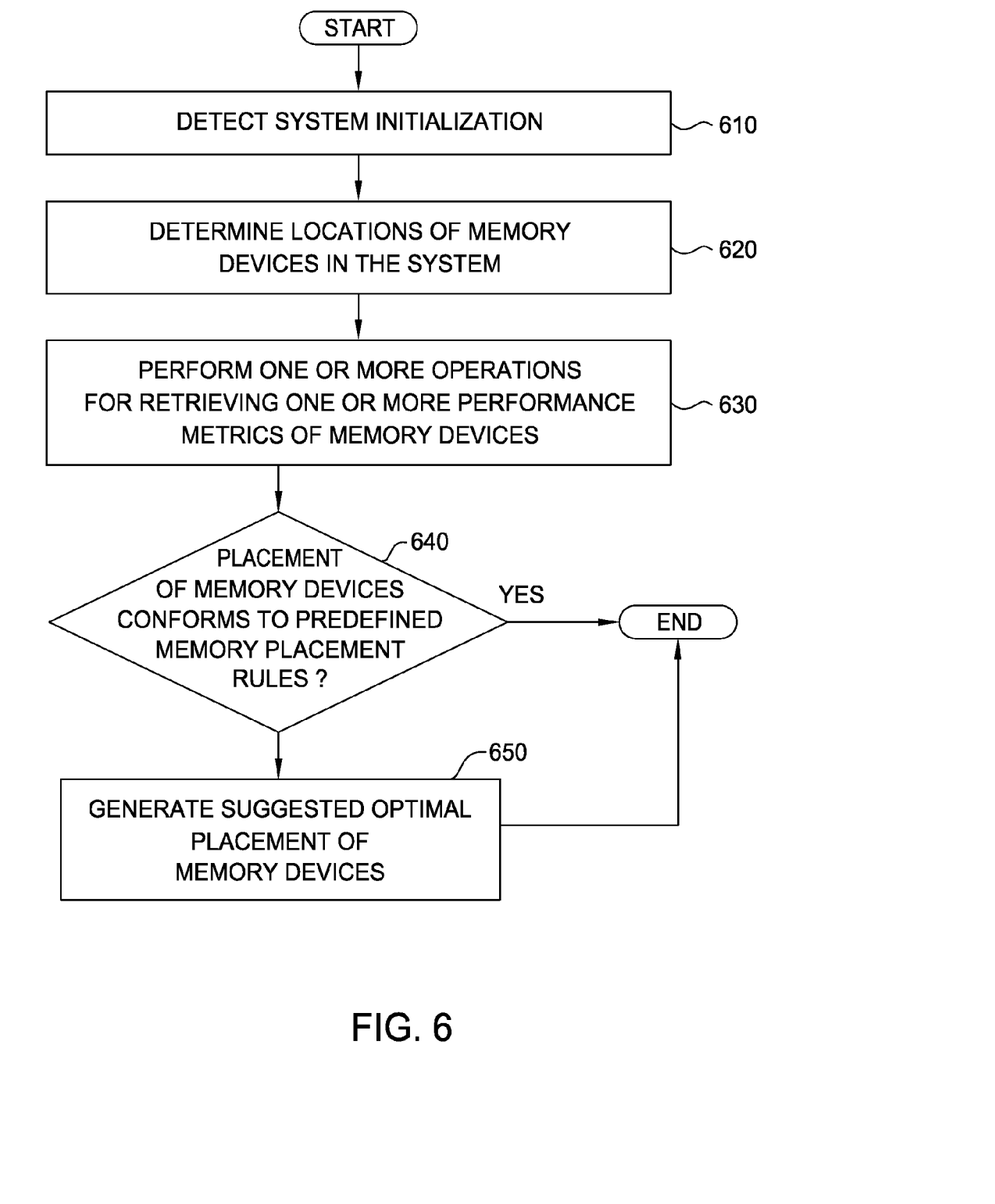
FIG. 6 is a flow diagram of exemplary operations performed by a memory controller, according to an embodiment of the invention.

FIG. 6 illustrates an exemplary flow diagram of operations that may be performed by a memory controller, according to an embodiment of the invention. Specifically, the operations may be performed by a logic circuit 511 within the memory controller. The operations may begin in step 610 by detecting a system initialization. Alternatively, the operations may begin upon receiving one or more commands from a processor. In step 620, the memory controller may determine locations of memory devices within the system. Determining the locations of memory devices in the system may include associating unique memory IDs with one or more of the memory slots of the system.

In step 630, the memory controller may perform one or more operations for retrieving one or more performance metrics of the memory devices. The performance metrics may include for example, memory latency, power consumption, and the like. As discussed above, retrieving the performance metrics may include accessing the memory devices to measure latency, power consumption, and the like. Retrieving performance metrics may also include accessing a performance measurement circuit in the memory devices.

In step 640, the memory controller may determine whether the placement of the memory devices in the system conforms to one or more predefined memory placement rules. If placement of memory devices conforms to the predefined memory placement rules, the operations may end. On the other hand if placement of memory devices does not conform to the predefined memory placement rules, in step 650, the memory controller may generate a suggested optimal placement of the memory devices in the system according to the predefined memory placement rule.

Figure 7:
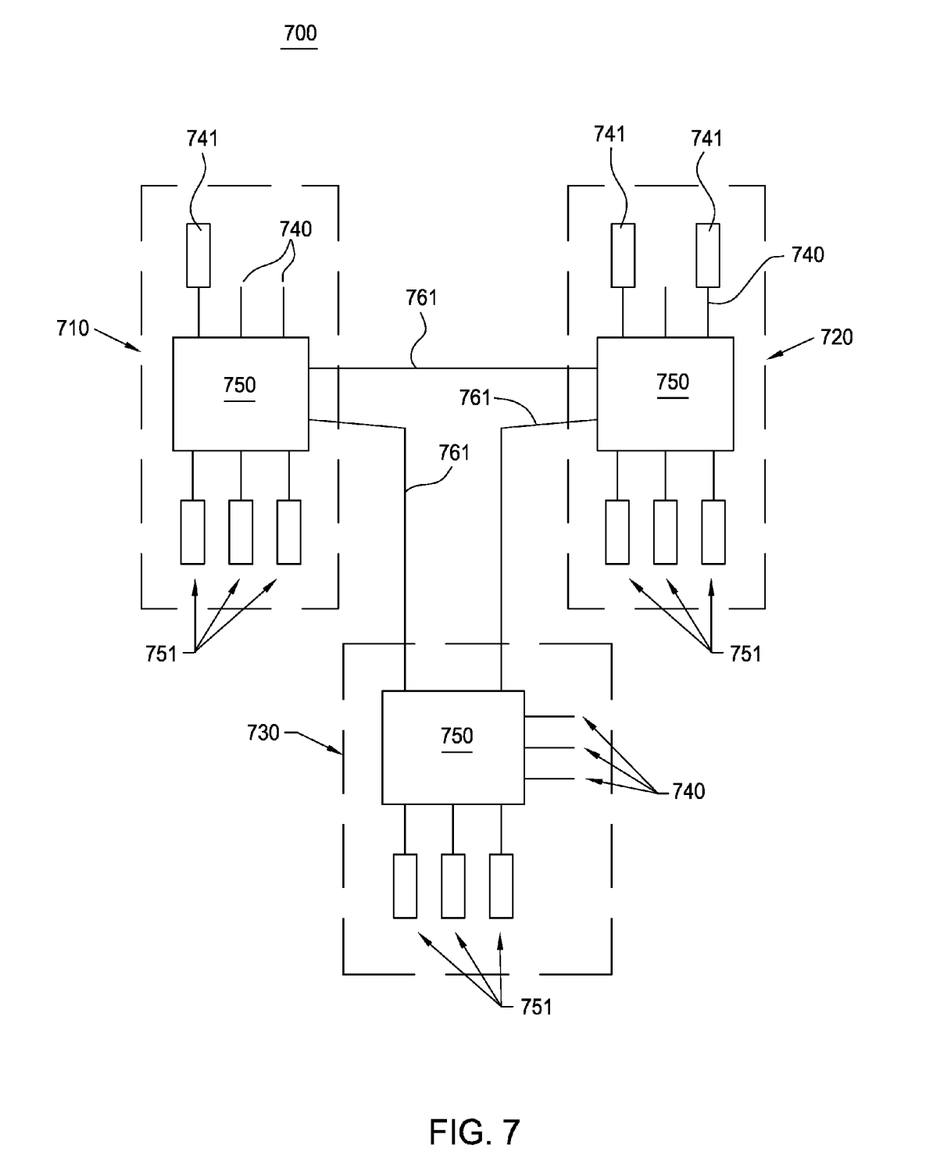
FIG. 7 illustrates another exemplary system according to an embodiment of the invention.

While determining placement of memory devices in daisy-chained slots is described herein, in alternative embodiments, the memory controller may be configured to determine optimal placement of memory devices in any type of system architecture. FIG. 7 illustrates another exemplary system 700 according to an embodiment of the invention. The system 700 may be a multiprocessor system comprising a plurality of nodes, e.g., nodes 710, 720, and 730. Each node may include a plurality of processor slots 740, a processor 741 in one or more of the slots 740, a memory controller 750, and one or more memory devices 751 coupled to each memory controller 750.

As illustrated in FIG. 7, not all of the nodes may include a processor. For example, only the nodes 710 and 720 include processors, but node 730 does not include a processor. Each of the nodes 710-730 may be configured to communication with each other via the busses 761, as illustrated in FIG. 7. In one embodiment, it may be desirable to place the memories with lowest latencies closest to the processors of the system. Accordingly, one or more of the memory controllers 750 may be configured to perform operations, e.g., the operations described in FIG. 6 to determine an optimal placement of the memory devices in the system.

While placement of DIMM memories in DIMM memory slots is described herein, in alternative embodiments, similar operations may be performed to determine physical placement of any type of memory, or groups of memories. For example, in some embodiments, the operations described hereinabove may be used to determine placement of memory drawers in a memory cabinet.

While the foregoing is directed to embodiments of the present invention, other and further embodiments of the invention may be devised without departing from the basic scope thereof, and the scope thereof is determined by the claims that follow.

What is claimed is:

1. A method for optimally placing a plurality of memory devices in a plurality of memory slots of a system, comprising:

for each memory device in the system, determining a slot of the plurality of slots in which the memory device is placed;

determining a memory access latency for accessing a memory array in a first memory device of the plurality of memory devices located in a first memory slot and a second memory device of the plurality of memory devices located in a second memory slot in response to a memory access command from a memory controller, wherein the plurality of memory devices comprise an oscillator which oscillates at a frequency for deriving a time required for accessing the memory array;

retrieving the memory access latency from the first and second memory devices, where the first memory device has the lowest memory access latency of the plurality of memory devices and the second memory device has the highest memory latency of the plurality of memory devices;

determining a distance between each of the memory slots and the memory controller; and providing a recommendation to rearrange the plurality of memory devices such that the first memory device having the lowest memory access latency is moved from the first memory slot to a memory slot closest to the memory controller while the second memory device having the highest memory latency is moved from the second memory slot to a memory slot furthest from the memory controller.

2. The method of claim 1, further comprising:

measuring power consumed by the plurality of memory devices; and providing a different recommendation for rearranging the plurality of memory devices such that a memory device of the plurality of memory devices that consumes the least amount of power is placed in the memory slot closest to the memory controller while a memory device of the plurality of memory devices that consumes the most amount of power is placed in the memory slot furthest from the memory controller.

3. The method of claim 1, wherein retrieving the memory access latency comprises accessing a performance measurement circuit within each of the plurality of memory devices, the performance measurement circuit determining the memory access latency for each of the plurality of memory devices using the oscillator, wherein the oscillator is a ring oscillator.

4. The method of claim 3, wherein the plurality of memory devices are dual inline memory modules (DIMMs), and the memory slots are DIMM memory slots.

5. The method of claim 3, wherein the plurality of memory devices are memory drawers, each comprising a plurality of memory modules.

6. The method of claim 1, wherein the plurality of memory devices are dual inline memory modules (DIMMs), and the memory slots are DIMM memory slots.

7. A logic circuit configured to determine optimal placement of a plurality of memory devices in a plurality of memory slots of a system, wherein the logic circuit is configured to:

for each memory device in the system, determine a slot of the plurality of slots in which the memory device is placed;

determining a memory access latency for accessing a memory array in a first memory device of the plurality of memory devices located in a first memory slot and a second memory device of the plurality of memory devices located in a second memory slot in response to a memory access command from a memory controller, wherein the plurality of memory devices comprise an oscillator which oscillates at a frequency for deriving a time required for accessing the memory array;

retrieving the memory access latency from the first and second memory devices, where the first memory device has the lowest memory access latency of the plurality of memory devices and the second memory device has the highest memory latency of the plurality of memory devices;

determining a distance between each of the memory slots and the memory controller; and providing a recommendation to rearrange the plurality of memory devices such that the first memory device having the lowest memory access latency is moved from the first memory slot to a memory slot closest to the memory controller while the second memory device having the highest memory latency is moved from the second memory slot to a memory slot furthest from the memory controller.

8. The logic circuit of claim 7, further comprising:

measuring power consumed by the plurality of memory devices; and providing a different recommendation for rearranging the plurality of memory devices such that a memory device of the plurality of memory devices that consumes the least amount of power is placed in the first memory slot closest to the memory controller while a memory device of the plurality of memory devices that consumes the most amount of power is placed in the memory slot furthest from the memory controller.

9. The logic circuit of claim 7, wherein retrieving the memory access latency comprises accessing a performance measurement circuit within of the plurality of each memory devices, the performance measurement circuit determining the memory access latency for each of the plurality of memory devices using the oscillator, wherein the oscillator is a ring oscillator.

10. The logic circuit of claim 9, wherein the plurality of memory devices are dual inline memory modules (DIMMs), and the memory slots are DIMM memory slots.

11. The logic circuit of claim 9, wherein the plurality of memory devices are memory drawers, each comprising a plurality of memory modules.

12. The logic circuit of claim 7, wherein the plurality of memory devices are dual inline memory modules (DIMMs), and the memory slots are DIMM memory slots.

13. A system, comprising:
a controller; and
a plurality of memory devices placed in a plurality of memory slots,
wherein the controller is configured to:
for each memory device in the system, determine a slot of the plurality of slots in which the memory device is placed;
receive from a first memory device of the plurality of memory devices located in a first memory slot and a second memory device of the plurality of memory devices located in a second memory slot a respective memory access latency for accessing a memory array in the first and second memory devices in response to a memory access command from a memory controller, where the first memory device has the lowest memory access latency of the plurality of memory devices and the second memory device has the highest memory latency of the plurality of memory devices, wherein the plurality of memory devices comprise an oscillator which oscillates at a frequency for deriving a time required for accessing the memory array;
determine a distance between each of the memory slots and the memory controller; and
provide a recommendation to rearrange the plurality of memory devices such that the first memory device having the lowest memory access latency is moved from the first memory slot to a memory slot closest to the memory controller while the second memory device having the highest memory latency is moved from the second memory slot to a memory slot furthest from the memory controller.

14. The system of claim 13, wherein the controller is further configured to:
measure power consumed by the plurality of memory devices; and
provide a different recommendation for rearranging the plurality of memory devices such that a memory device of the plurality of memory devices that consumes the least amount of power is placed in the first memory slot closest to the memory controller while a memory device of the plurality of memory devices that consumes the most amount of power is placed in the memory slot furthest from the memory controller.

15. The system of claim 13, wherein retrieving the memory access latency comprises accessing a performance measurement circuit within each of the plurality of memory devices, the performance measurement circuit determining the memory access latency for each of the plurality of memory devices using the oscillator, wherein the oscillator is a ring oscillator.

16. The system of claim 15, wherein the plurality of memory devices are dual inline memory modules (DIMMs), and the memory slots are DIMM memory slots.

17. The system of claim 15, wherein the plurality of memory devices are memory drawers, each comprising a plurality of memory modules.

18. The system of claim 13, wherein the plurality of memory devices are dual inline memory modules (DIMMs), and the memory slots are DIMM memory slots.

* * * * *